Patented May 5, 1942

2,282,006

UNITED STATES PATENT OFFICE 2,282,006

PIGMENT AND COATING COMPOSITIONS CONTAINING THE SAME

Clifford K. Sloan, Wilmington, Del., assignor to E. I. du Pont de Nemours & Company, Wilmington, Del., a corporation of Delaware No Drawing. Application June 1, 1940, Serial No. 338,384

23 Claims. (Cl. 106—308)

This invention relates to pigments and more particularly to processes for increasing the efficiency of filtration during manufacture of pigments and for improving the texture and other properties of pigments and to improved pigment compositions.

Most pigment manufacturing processes at some stage involve the formation of a suspension of finely divided pigment particles in an aqueous medium. Ordinary pigment practice involves the removal of water from the pigment prior to use in coating compositions. In many cases the finely divided precipitated pigment must be washed at length in order to remove water-soluble salts. As ordinarily practiced, such washing operation is very troublesome, whether conducted by a vat decantation process inasmuch as the finely divided particles settle very slowly, or whether by a filter press process inasmuch as the finely divided pigment particles tend to run through the filter cloth, finally plugging up the pores of the cloth, making for extremely slow filtration. Efficiency of washing and filtration is thus often low, due to both the time consuming factor and to reduced yield of product.

Many pigments that are difficult to wash and filter also give difficulty in the ease of grinding, the finally dried pigment requiring a prolonged grinding action during incorporation in organic vehicles such as are used in the manufacture of pigmented coating compositions. This grinding difficulty is often the result of aggregates formed by cementation during the drying of the water-wet system, with resultant loss of the original finely divided condition. This difficulty may be in part due to retention of water-soluble salts in the pigment press cake caused by inefficient washing, or in part due to actual cohesion and growth together of the close packed individual particles. Such large grit particles that are formed require a vigorous disruptive grinding action in coating composition vehicles in order to make them suitable from the standpoint of texture and of rate of color development.

Attempts have been made to improve the rate of filtration and texture of pigment by flocculating the pigment prior to drying from an aqueous system. Thus, U. S. Patent 1,919,714 discloses the use of ordinary soaps such as sodium stearate for flocculating a suspension in water of a pigment such as barium sulfate. Furthermore, U. S. Patent No. 2,192,956 of Sloan and Patterson, issued March 12, 1940, discloses the advantage obtainable by use as the flocculating agent for this purpose of a surface-active material of the cation-active type in which the long chain radical is in the positive part of the compound.

This invention has as an object an improvement in the preparation of pigments. A further object is improving the effect of cation-active agents in promoting efficiency during filtration and washing of pigments in aqueous systems. Another object is to produce pigments of improved texture which can be ground into coating composition vehicles with a minimum of energy. Another object is to reduce the cost involved in the treatment of pigments with cation-active type of agent. A still further object is to reduce the amount of cation-active agent in order that the resulting pigment may have a higher actual pigment content. Additional objects will become apparent from an examination of the following description and claims.

These objects are attained according to the herein described invention which broadly comprises adding to a water-wet pigment a water-soluble cation-active material and a volatile organic liquid, said liquid being substantially immiscible with water and thereafter processing the treated pigment in the ordinary manner to give a dry pigment in bulk form.

In a more restricted sense this invention comprises adding to a water-wet pigment a water-immiscible volatile organic liquid, preferably one boiling between about 60° C. and about 250° C., and a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, thereafter separating the excess water, drying the pigment, and recovering said pigment as a dry bulk powder.

One preferred embodiment of this invention comprises adding to a water-wet pigment between about 0.02% and about 25%, based upon the weight of the pigment before treatment, of toluene and between about 0.01% and about 15%, based upon the weight of the pigment before treatment, of an alkyl ammonium halide, specifically dodecyl ammonium chloride, separating the excess water, drying the pigment, and recovering said pigment as a dry bulk powder.

The two agents, namely, the volatile organic liquid and the cation-active agent, may be added to the aqueous pigment system in any order prior to the drying of the pigment. Thus, addition may be made first, after completion of the pigment strike but prior to washing; second, after vat washing but prior to filtration; third, during filter pressing; fourth, by mixing with the press cake prior to drying. The addition may even be made to a liquid used in striking prior to actual precipitation, although this latter practice should not be followed without first ascertaining that the pigment is not injuriously affected in tinctorial properties. The two agents may be added simultaneously, such as in the form of a solution of the cation-active agent in the volatile organic vehicle, or in the form of an aqueous emulsion containing the cation-active agent and the volatile organic vehicle.

This invention may be more readily understood by an examination of the following examples which are given for illustrative purposes and are not intended to place any restrictions or limitations on the herein described invention.

*Example I*

Iron blue was prepared in an aqueous system by precipitation and oxidation according to ordinary methods. To 1000 parts of the slurry containing 40 parts of pigment was added 5 parts of hexadecyl pyridinium bromide in the form of a 10% solution in water. The slurry was agitated. Ten parts of toluene was then added and the slurry agitated again. The slurry was then filtered on a suction filter and washed with 2000 parts of water to remove water-soluble salts, including sodium sulfate, present in the mother liquor. The resulting press cake was dried at 70° C. and pulverized in the usual manner. With this combined use of the cation-active agent and water-immiscible liquid it was found that an advantage was obtained in (1) less time for filtration, (2) less loss of material through the filter, and (3) improved ease of grinding of the resulting pigment in coating composition vehicles. The following data give the comparison in filtration efficiency and ease of grinding as compared with iron blue pigments prepared by the same process except that in one case both hexadecyl pyridinium bromide and toluene were omitted and in the other case the toluene only was omitted. The improvement in ease of grinding was demonstrated by grinding 2 parts of the dry pigment in a quart steel ball mill with 100 parts of a white linseed oil modified alkyd enamel. Progress samples were taken after ¼-hour, ½-hour, one-hour, two-hour, four-hour, and 72-hour intervals, and the rate of color development expressed on a numerical basis. The tint obtained by grinding the untreated material for 72 hours was arbitrarily graded as 100 and the other samples graded by matching with standards prepared by diluting this primary standard with known amounts of the original white enamel. For some of the treated samples that ground out to a deeper blue color than this control, it was necessary to dilute the sample under test in order to compare with the primary standard. The data on filtration efficiency and grinding follow:

It was noted that the blue treated with both cation-active agent and water-immiscible organic liquid required but one hour's grinding to develop the color strength of the 72-hour sample of the control, whereas more than four hours of grinding was required to develop this color value when the cation-active agent only was used to treat the pigment. The filtration efficiency was also definitely improved by the combined treatment.

*Example II*

Two thousand parts of an aqueous press cake containing 660 parts of iron blue pigment which had been precipitated, filter pressed, and washed by ordinary methods were mixed in a Werner-Pfleiderer kneading-type mixer with 20 parts of octadecyl trimethyl ammonium bromide and 60 parts of tetrachloroethylene. The paste was then dried at 70° C. and pulverized by ordinary methods. The resultant dry pigment was found to grind more readily into oil media than a product prepared in the same manner but without addition of the combination of octadecyl trimethyl ammonium bromide and tetrachloroethylene. The iron blue pigment used in this example was of a type requiring less agent than does the iron blue type used in Example I. The use of tetrachloroethylene permits a further reduction in the amount of the more expensive cation-active agent. In this case, the final pigment contained no more than 3% of agent. Furthermore, the use of a nonflammable organic liquid decreased the hazards involved in the drying process.

*Example III*

A 7% slurry of titanium dioxide pigment was prepared in the usual way by calcination of the pigment and then grinding in water. A portion of this slurry containing 1000 parts of titanium dioxide pigment was treated by the addition of 100 parts of a solution containing 10 parts of dodecyl ammonium chloride prepared by reaction of dodecyl amine with hydrochloric acid and 90 parts of water. A definite flocculating action of the cation-active agent on the pigment suspension was noted. After mixing, 80 parts of toluene was added to the suspension and the mass further agitated. Increased flocculation resulted. The pigment was readily filtered and then dried by ordinary methods. The resulting dry bulk pigment was found to have improved texture properties. Two and eight-tenths grams of the dry pigment was mixed with 1.5 cc. of linseed oil and rubbed out on a glass plate with a spatula to give a smooth paint free of unground aggregates. A similar texture test, but using dry titanium dioxide pigment that had been prepared in a similar manner except that the combined treatment with cation-active agent and water-immiscible liquid had been omitted, mixed with the linseed oil much less readily when tested in this same manner, and the resultant paint was found to have unground aggregates after the same spatula mulling period as used in treatment of the treated

| Treatment of pigment | Time required for filtration | Loss of color through filter | Relative ease of grinding (rate of color development) | | | | | |
|---|---|---|---|---|---|---|---|---|
| | | | ¼ hr. | ½ hr. | 1 hr. | 2 hrs. | 4 hrs. | 72 hrs. |
| None | 5 hrs | | | | | | | |
| Cation-active agent only (hexadecyl pyridinium bromide) | 2 hrs., 45 min | Considerable | 20 | 32 | 43 | 52 | 60 | 100 |
| | | Some | 50 | 70 | 85 | 89 | 91 | 109 |
| Both hexadecyl pyridinium bromide and toluene | 2 hrs., 20 min | None | 66 | 92 | 100 | 101 | 102 | 109 | pigment. Two pigments treated separately with toluene and with the dodecyl ammonium chloride were found to be inferior to the products prepared by the combined treatment when examined in this texture test, although the product treated with the cation-active agent alone was still definitely better than the untreated pigment.

It is to be understood that the herein described specific embodiments of this invention may be subjected to variation and modification without departing from the scope thereof. Thus, although the above examples illustrate the use of relatively few cation-active materials, of few water-immiscible liquids, and of few pigments, the invention includes the treatment of any pigment with any combination of a cation-active agent of the specified class with any volatile water-immiscible organic liquid.

Among the cation-active agents that are useful in this invention are to be included cation-active agents that are water-soluble, including long chain amines in the form of water-soluble salts, water-soluble hydroxy derivatives, and the like; quaternary ammonium compounds; sulfonium compounds; and phosphonium compounds, said compounds having an open chain aliphatic radical of at least 8 carbon atoms in chain length. The preferred compounds are those in which the long chain aliphatic radical is an alkyl radical and which have the alkyl radical attached directly to the nitrogen, sulfur, and phosphorous atoms, respectively. In the case of the nitrogen compounds, materials having but one nitrogen atom are to be preferred. Among the water-soluble long chain amines that may be used are included compounds of either primary, secondary, or tertiary character that have been solubilized by conversion of the long chain amine by reaction with solubilizing acids such as sulfuric, hydrochloric, nitric, acetic, formic, sulfamic, and the like. As specific representatives of amines that may be solubilized in this manner, such materials as dodecylamine, hexadecylamine, octadecylamine, dodecyl dimethylamine, didodecylamine, octadecyl diethylamine, and the like, may be utilized. As representatives of long chain amines that have been solubilized by introduction of other water polar groups, such as the hydroxy groups, may be utilized such materials as didodecyl ethanolamine, dodecyl diglycerrolamine, dodecyl methylglucamine, and the like. In certain cases the water-insoluble amine compound itself may be utilized, e. g., in the presence of acid in the pigment slurry where solubilization of the long chain amine will take place in the pigment slurry.

Among the quaternary ammonium compounds that may be utilized in this invention are included those of the trimethylamine, pyridine, and betaine types. Representative compounds of this class include octadecyl trimethyl ammonium bromide, hexadecyl trimethyl ammonium bromide, dodecyl pyridinium sulfate, dodecyl pyridinium bromide, dodecyl pyridinium chloride, hexadecyl pyridinium bromide, octadecyl pyridinium bromide, octadecyl oxymethyl pyridinium chloride, octadecyl choline chloride, octadecyl betaine, and the like. Among the long chain cation-active agents of the sulfonium type are to be included water-soluble salts of organic compounds which are characterized by having at least one ternary sulfonium residue to which is attached at least one alkyl chain containing 8 or more carbon atoms. As specific representatives of this species, including compounds in which the sulfur atom has a positive valence of 4, are to be included methyl benzyl stearyl sulfonium methyl sulfate, lauryl dimethyl sulfonium methyl sulfate, and the like.

A still further species of cation-active agent that may be utilized in this invention includes the phosphorus compounds similar in structure to the nitrogen containing compounds described above. Included in this class are water-soluble salts of organic compounds which are characterized by having at least one phosphonium residue to which is attached at least one aliphatic group containing an aliphatic residue of at least 8 carbon atoms.

It is to be understood that this invention is not limited to the water-immiscible organic liquids listed in the above examples. Thus, although the examples show the use of water-immiscible organic liquid boiling between about 60° C. and about 250° C. it is to be understood that improved results are obtained by employing water-immiscible organic liquids boiling below about 60° C. or above about 250° C. However, I have found it desirable to employ water-immiscible organic liquids boiling between about 60° C. and about 250° C. since it permits the evaporation of said materials in a commercially feasible manner. Further, liquids boiling in the lower part of the aforesaid range, namely, below about 150° C. are to be preferred because of their ready removal at ordinary drying temperatures such as between about 60° C. and about 90° C. Furthermore, nonflammable organic liquids are to be preferred because of the reduced fire hazard. Among the water-immiscible organic liquids which may be used in this process are included toluene, benzene, amyl acetate, mineral spirits, butyl acetate, butyl alcohol, xylene, trichloroethylene, tetrachloroethylene, tetrachloroethane, and the like.

It is to be understood that this invention is not limited to the pigments listed in the above examples. The examples are to be taken as illustrative of the applicability of our invention to all pigments, and especially to those which give difficulty in washing, filtration, and texture. By the term "pigment" we means substances which are generally considered insoluble in the vehicle, as distinguished from dyestuffs which are generally considered soluble. The invention thus includes the combined use of a cation-active agent and a water-immiscible organic liquid for treatment of aqueous systems containing all pigments including such materials, well known commercially, as iron blue, the lead chromate pigments such as chrome yellows, chrome oranges, chrome greens and molybdate orange, zinc yellow, red lead, phosphotungstic acid pigments, phthalocyanines, azo type pigments such as lithol reds and toluidine reds, alumina hydrate and lakes using alumina hydrate as the substratum, carbon black, iron oxide, zinc oxide, leaded zinc oxide, zinc sulfide containing pigments, titanium containing pigments, white lead and extenders such as calcium carbonate and barium sulfate.

The amount of the two types of agents to be used in accordance with this invention varies considerably with the particular pigment system and with the effect desired. The specific surface and density of the pigment to be treated are important factors. Thus, with a relatively large particle size extender much less agent will be required than in the treatment of a finely divided pigment system. For improving the texture of relatively coarse extenders as little as 0.1%, based on the weight of the pigment before treatment, of the cation-active agent may be used, whereas for fine particle size material as much as 15% may be desirable. Many of the commonly used pigments, such as titanium dioxide, chrome yellow, zinc sulfide, and pigments of the like particle size, usually require an amount of cation-active agent in the range of 0.5 to 1.5% for improving texture. Those operating this invention on a given pigment and using a given cation-active agent, will observe an optimum range below which texture improvement is incomplete and above which additional agent begins to redisperse pigment in the aqueous system, giving rise to decreased advantage from the filtration efficiency standpoint. It is thus to be understood that the preferred range as to amount of cation-active agent to be used for texture improvement is largely dependent on the pigment being used and on the particle size thereof and may be, for example, as low as about 0.1% and as high as about 15%, but more or less can be used, provided the point is not passed where, with the pigment in hand, redispersion occurs to an objectionable degree.

For obtaining improved texture by the combined use of a cation-active agent and a volatile water-immiscible liquid, the amount of water-immiscible liquid to be used also varies considerably with the specific pigment treated. In general, best results are obtained if the amount of water-immiscible organic liquid to be used is somewhat greater than the cation-active agent used along with it. One advantage of this is that use is thus made of a greater amount of the agent which is cheaper and which is volatilized from the pigment during the drying process. In no case is more than about 25% required to give the advantageous results of the invention, but some excess may, if desired, be used without disadvantage. Thus, for such a finely divided pigment as iron blue, although 25% of water immiscible organic liquid based on the pigment usually suffices for the purpose of this invention, this amount may be exceeded without causing complete transfer of pigment from the water to the organic phase, such transfer being described in Sloan and Patterson U. S. Patent No. 2,192,954, issued March 12, 1940. For pigments of larger particle size, these upper limits are correspondingly lower. Thus, the optimum quantity of the water immiscible agent depends on the character and particle size of the pigment to be treated, the optimum amount of the agent increasing as the particle size decreases. Some excess of the agent over optimum amount is permissible, providing the excess is not so great as to cause transfer of the pigment from the water to the organic liquid phase to an extent which is objectionable, having regard to the purpose in view. Thus such commercially important pigments of the titanium dioxide, zinc sulfide, chrome yellow, and the like particle size characteristics, from 1% to 10% of water-immiscible liquid on the pigment usually suffices. For the coarser extender type of pigment, smaller amounts are required to give equivalent results and even as little as 0.25% gives a result showing marked improvement.

Even smaller quantities of both types of agents may be used in this invention for improving the filtration efficiency of pigments generally than is the case when such agents are used primarily for a texture improvement. Thus, for a given pigment the amount of agent of both types that beneficially affects the efficiency of vat and filter press washing may be in the range as low as one-tenth of that amount desirable for optimum texture improvement.

While I have disclosed the preferred amounts of the cation-active agent and the water-immiscible organic liquid to be used with certain types of pigments for the purpose of improving the filtration and texture of said pigments, it is to be understood that an improvement in filtration and texture is obtained with all types of pigments by using an amount of the specified cation-active agent in the range of 0.01% to 15% and by using together therewith an amount of a volatile water-immiscible organic liquid in the range of 0.02% to 25%, said percentages being based on the weight of the pigment before treatment.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process which comprises mixing a water-wet pigment, a volatile water-immiscible organic liquid and a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, separating the excess water, drying the pigment, and recovering the pigment as a dry bulk powder.

2. A process which comprises adding to a water-wet pigment a water-immiscible organic liquid boiling between about 60° C. and about 250° C. and a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, separating the excess water, drying the pigment, and recovering the pigment as a dry bulk powder.

3. A process which comprises adding to a water-wet pigment between about 0.02% and about 25%, based upon the weight of the pigment, of a water-immiscible organic liquid boiling between about 60° C. and about 250° C. and between about 0.01% and about 15%, based upon the weight of the pigment, of a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, separating the excess water, drying the pigment, and recovering the pigment as a dry bulk powder.

4. A process which comprises adding to a water-wet pigment between about 0.02% and about 25%, based upon the weight of the pigment, of a water-immiscible organic liquid boiling between about 60° C. and about 250° C. and between about 0.01% and about 15%, based upon the weight of the pigment, of a water-soluble cation-active amine, containing only one nitrogen atom, said compound containing an open chain aliphatic radical of at least 8 carbon atoms in chain length directly linked to the nitrogen atom, separating the excess water, drying the pigment, and recovering said pigment as a dry bulk powder.

5. A process which comprises adding to a water-wet pigment between about 0.02% and about 25%, based upon the weight of the pigment, of a water-immiscible organic liquid boiling between about 60° C. and about 250° C. and between about 0.01% and about 15%, based upon the weight of the pigment, of a water-soluble cation-active salt of an amine, containing only one nitrogen atom, said compound containing an open chain aliphatic radical of at least 8 carbon atoms in chain length directly linked to the nitrogen atom, separating the excess water, drying the pigment, and recovering said pigment as a dry bulk powder.

6. A process which comprises adding to a water-wet pigment between about 0.02% and about 25%, based upon the weight of the pigment, of a water-immiscible organic liquid boiling between about 60° C. and about 250° C. and between about 0.01% and about 15%, based upon the weight of the pigment, of a water-soluble cation-active quaternary ammonium compound, containing only one nitrogen atom, said compound containing an open chain aliphatic radical of at least 8 carbon atoms in chain length directly linked to the nitrogen atom, separating the excess water, drying the pigment, and recovering said pigment as a dry bulk powder.

7. A process which comprises adding to a water-wet pigment between about 0.02% and about 25%, based upon the weight of the pigment, of a water-immiscible organic liquid boiling between about 60° C. and about 250° C. and between about 0.01% and about 15%, based upon the weight of the pigment, of a water-soluble cation-active sulfonium compound, said compound containing an open chain aliphatic radical of at least 8 carbon atoms in chain length directly linked to the sulfur atom, separating the excess water, drying the pigment, and recovering said pigment as a dry bulk powder.

8. A process which comprises adding to a water-wet pigment between about 0.02% and about 25%, based upon the weight of the pigment, of a water-immiscible organic liquid boiling between about 60° C. and about 250° C. and between about 0.01% and about 15%, based upon the weight of the pigment, of an alkyl pyridinium halide the alkyl radical of which contains at least 8 carbon atoms in chain length directly attached to the nitrogen atom, separating the excess water, drying the pigment, and recovering the pigment as a dry bulk powder.

9. A process which comprises adding to a water-wet pigment between about 0.02% and about 25%, based upon the weight of the pigment, of a water-immiscible organic liquid boiling between about 60° C. and about 250° C. and between about 0.01% and about 15%, based upon the weight of the pigment, of a water-soluble cation-active salt of a long-chain alkyl amine the alkyl radical of which contains at least 8 carbon atoms in chain length directly attached to the nitrogen atom, separating the excess water, drying the pigment, and recovering said pigment as a dry bulk powder.

10. A process which comprises adding to a water-wet pigment toluene and dodecyl ammonium chloride, separating the excess water, drying the pigment, and recovering said pigment as a dry bulk powder.

11. A dry pigment in bulk form which consists of a pigment and a cation-active agent selected from the class consisting of long chain amines having only one nitrogen atom, salts of long chain amines containing only one nitrogen atom, long chain quaternary ammonium compounds containing one nitrogen atom, and long chain sulfonium and phosphonium compounds, said compounds being characterized by having an alkyl radical of at least 8 carbon atoms in chain length attached directly to the nitrogen, sulfur, and phosphorous atoms respectively said pigment being substantially identical with a pigment produced by mixing a water-wet pigment, a volatile water-immiscible organic liquid and a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, separating the excess water, drying the pigment, and recovering the pigment as a dry bulk powder.

12. A dry pigment in bulk form which consists of a pigment and a water-soluble cation-active amine containing only one nitrogen atom, said compound containing an open chain aliphatic radical of at least 8 carbon atoms in chain length directly linked to the nitrogen atom, said pigment being substantially identical with a pigment produced by mixing with a water-wet pigment a volatile water-immiscible organic liquid and a water-soluble cation-active amine containing only one nitrogen atom, said compound containing an open chain aliphatic radical of at least 8 carbon atoms in chain length directly linked to the nitrogen atom, separating the excess water, drying the pigment, and recovering said pigment as a dry bulk powder.

13. A dry pigment in bulk form which consists of a pigment and a water-soluble cation-active salt of an amine containing only one nitrogen atom, said compound containing an open chain aliphatic radical of at least 8 carbon atoms in chain length directly linked to the nitrogen atom, said pigment being substantially identical with a pigment produced by mixing a water-wet pigment, a volatile water-immiscible organic liquid and a water-soluble cation-active salt of an amine containing only one nitrogen atom, said compound containing an open chain aliphatic radical of at least 8 carbon atoms in chain length directly linked to the nitrogen atom, separating the excess water, drying the pigment, and recovering said pigment as a dry bulk powder.

14. A dry pigment in bulk form which consists of a pigment and a water-soluble cation-active salt of a long-chain alkyl amine the alkyl radical of which contains at least 8 carbon atoms in chain length directly attached to the nitrogen atom, said pigment being substantially identical with a pigment produced by mixing a water-wet pigment, a volatile water-immiscible organic liquid and a water-soluble cation-active salt of a long-chain alkyl amine the alkyl radical of which contains at least 8 carbon atoms in chain length directly attached to the nitrogen atom, separating the excess water, drying the pigment, and recovering said pigment as a dry bulk powder.

15. A dry pigment in bulk form which consists of a pigment and a water-soluble cation-active quaternary ammonium compound containing only one nitrogen atom, said compound containing an open chain aliphatic radical of at least 8 carbon atoms in chain length directly attached to the nitrogen atom, said pigment being substantially identical with a pigment produced by mixing a water-wet pigment, a volatile water-immiscible organic liquid and a water-soluble cation-active quaternary ammonium compound containing only one nitrogen atom, said compound containing an open chain aliphatic radical of at least 8 carbon atoms in chain length directly linked to the nitrogen atom, separating the excess water, drying the pigment, and recovering said pigment as a dry bulk powder.

16. A dry pigment in bulk form which consists of a pigment and a water-soluble cation-active sulfonium compound, said compound containing an open chain aliphatic radical of at least 8 carbon atoms in chain length directly linked to the sulfur atom, said pigment being substantially identical with a pigment produced by mixing a water-wet pigment, a volatile water-immiscible organic liquid and a water-soluble cation-active sulfonium compound, said compound containing an open chain aliphatic radical of at least 8 carbon atoms in chain length directly linked to the sulfur atom, separating the excess water, drying the pigment, and recovering said pigment as a dry bulk powder.

17. A process which comprises adding to a water-wet iron blue pigment between about 0.02% and about 25%, based upon the weight of the pigment, of a water-immiscible organic liquid boiling between about 60° C. and about 250° C. and between about 0.01% and about 15%, based upon the weight of the pigment, of a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, separating the excess water, drying the pigment, and recovering the pigment as a dry bulk powder.

18. A process which comprises adding to a water-wet phthalocyanine pigment between about 0.02% and about 25%, based upon the weight of the pigment, of a water-immiscible organic liquid boiling between about 60° C. and about 250° C. and between about 0.01% and about 15%, based upon the weight of the pigment, of a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, separating the excess water, drying the pigment, and recovering the pigment as a dry bulk powder.

19. A process which comprises adding to a water-wet zinc yellow pigment between about 0.02% and about 25%, based upon the weight of the pigment, of a water-immiscible organic liquid boiling between about 60° C., and about 250° C. and between about 0.01% and about 15%, based upon the weight of the pigment, of a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, separating the excess water, drying the pigment, and recovering the pigment as a dry bulk powder.

20. A dry pigment in bulk form which consists of an iron blue pigment and a cation-active agent selected from the class consisting of long chain amines having only one nitrogen atom, salts of long chain amines containing only one nitrogen atom, long chain quaternary ammonium compounds containing one nitrogen atom, and long chain sulfonium and phosphonium compounds, said compounds being characterized by having an alkyl radical of at least 8 carbon atoms in chain length attached directly to the nitrogen, sulfur, and phosphorous atoms respectively, said pigment being substantially identical with an iron blue pigment produced by mixing a water-wet iron blue pigment, a volatile water-immiscible organic liquid and a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, separating the excess water, drying the pigment, and recovering the pigment as a dry bulk powder.

21. A dry pigment in bulk form which consists of a phthalocyanine pigment and a cation-active agent selected from the class consisting of long chain amines having only one nitrogen atom, salts of long chain amines containing only one nitrogen atom, long chain quaternary ammonium compounds containing one nitrogen atom, and long chain sulfonium and phosphonium compounds, said compounds being characterized by having an alkyl radical of at least 8 carbon atoms in chain length attached directly to the nitrogen, sulfur, and phosphorous atoms respectively, said pigment being substantially identical with a phthalocyanine pigment produced by mixing a water-wet phthalocyanine pigment, a volatile water-immiscible organic liquid and a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, separating the excess water, drying the pigment, and recovering the pigment as a dry bulk powder.

22. A dry pigment in bulk form which consists of a zinc yellow pigment and a cation-active agent selected from the class consisting of long chain amines having only one nitrogen atom, salts of long chain amines containing only one nitrogen atom, long chain quaternary ammonium compounds containing one nitrogen atom, and long chain sulfonium and phosphonium compounds, said compounds being characterized by having an alkyl radical of at least 8 carbon atoms in chain length attached directly to the nitrogen, sulfur, and phosphorous atoms respectively, said pigment being substantially identical with a zinc yellow pigment produced by mixing a water-wet zinc yellow pigment, a volatile water-immiscible organic liquid and a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, separating the excess water, drying the pigment, and recovering the pigment as a dry bulk powder.

23. A coating composition containing as essential ingredients a drying oil vehicle and a pigment ground therein, said pigment consisting in the dry bulk form of a pigment and a cation-active agent selected from the class consisting of long chain amines having only one nitrogen atom, salts of long chain amines containing only one nitrogen atom, long chain quaternary ammonium compounds containing one nitrogen atom, and long chain sulfonium and phosphonium compounds, said compounds being characterized by having an alkyl radical of at least 8 carbon atoms in chain length attached directly to the nitrogen, sulfur, and phosphorous atoms respectively, said pigment being substantially identical with a pigment produced by mixing a water-wet pigment, a volatile water-immiscible organic liquid and a cation-active agent selected from the class consisting of amines, salts of amines, quaternary ammonium compounds, sulfonium compounds, and phosphonium compounds, said compounds containing an open chain aliphatic radical of at least 8 carbon atoms in chain length, separating the excess water, drying the pigment, and recovering the pigment as a dry bulk powder.

CLIFFORD K. SLOAN.